Jan. 9, 1951 — H. L. HILDESTAD — 2,537,054
COMBUSTION CHAMBER FUEL NOZZLE MOUNTING

Filed July 18, 1947 — 3 Sheets-Sheet 1

INVENTOR
Harold L. Hildestad
BY
ATTORNEY

Jan. 9, 1951     H. L. HILDESTAD     2,537,054
COMBUSTION CHAMBER FUEL NOZZLE MOUNTING
Filed July 18, 1947     3 Sheets-Sheet 2

WITNESSES:
John M. Wright
D. J. McCarty

INVENTOR
Harold L. Hildestad
BY
A. B. Reaves
ATTORNEY

Jan. 9, 1951  H. L. HILDESTAD  2,537,054
COMBUSTION CHAMBER FUEL NOZZLE MOUNTING
Filed July 18, 1947  3 Sheets-Sheet 3

WITNESSES:
John M. Wright
D. J. McCarty

INVENTOR
Harold L. Hildestad
BY
A. B. Reavis
ATTORNEY

Patented Jan. 9, 1951

2,537,054

UNITED STATES PATENT OFFICE 2,537,054

COMBUSTION CHAMBER FUEL NOZZLE MOUNTING

Harold L. Hildestad, Swarthmore, Pa., assignor to Westinghouse Electric Corporation, East Pittsburgh, Pa., a corporation of Pennsylvania Application July 18, 1947, Serial No. 761,929

9 Claims. (Cl. 60—44)

This invention relates to fuel combustion apparatus, and has for an object the provision of improved fuel combustion apparatus for a gas turbine power plant.

After continued operation of a gas turbine engine of the type comprising a combustion chamber interposed between an air compressor and a gas turbine operable by heated fluid under pressure to drive the compressor, undesired accumulation of solid products of fuel combustion or coke on or about the fuel nozzles may begin to impede the proper atomization and distribution of fuel necessary for uniform combustion. Heavy deposits of coke in the apical region of the combustion chamber are further undesirable due to the possibility that pieces of coke might become dislodged and travel into the turbine, causing damage to the blading. It is consequently desirable to provide a fuel combustion structure that will prevent or at least reduce the coking tendency during regular service operation of the engine.

Vaporization of fuel in the manifold, through which fuel is distributed to the combustion chamber, has also been a source of trouble in the operation of gas turbine engines, particularly those employed on aircraft under high altitude conditions. Radiation of heat from the flame in the combustion chamber to the fuel nozzles and manifold is a factor contributing to this premature fuel vaporization, which tends to induce the condition known as "vapor lock" under certain service operations.

It is, accordingly, a more specific object of this invention to provide an improved combustion apparatus for a gas turbine engine including a combustion chamber having fuel nozzles disposed in an apical portion thereof, and means for directing streams of air under pressure toward and about the nozzles and adjacent surfaces, thereby creating local turbulence effective to minimize deposition of coke and concentration of heat in the apical region of the combustion apparatus.

A further object of the invention is the provision of an improved fuel combustion apparatus including means for partially shielding the fuel nozzles from the flame in the combustion chamber, and means for interposing a blanket of turbulent air between the nozzles and the combustion region of the chamber.

Other objects and advantages of the invention will appear in the following more detailed description thereof, taken in connection with the accompanying drawings, in which.

Figure 2:
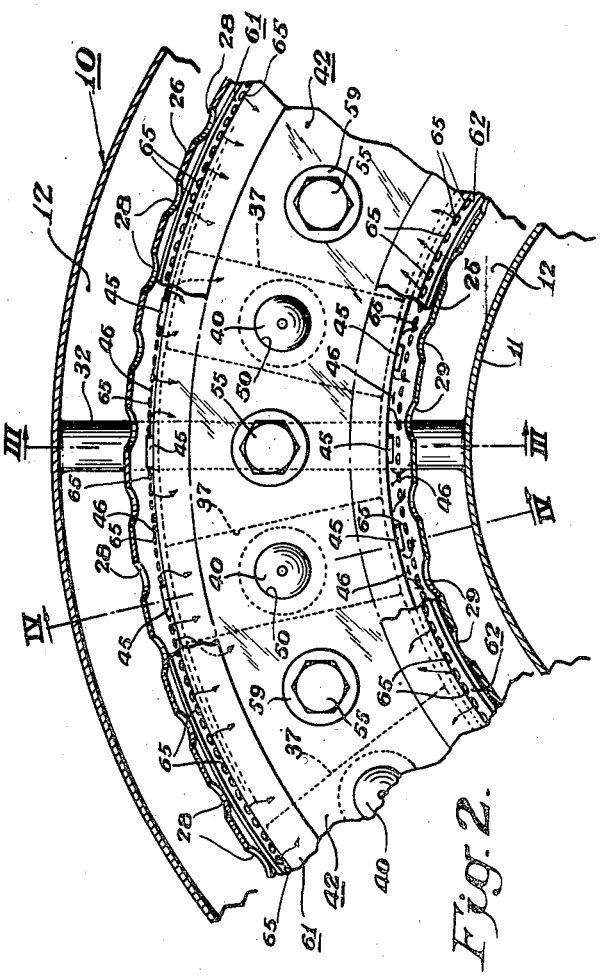
Fig. 2 is an enlarged detail sectional view taken substantially along the line II—II of Fig. 1.
Figure 3:
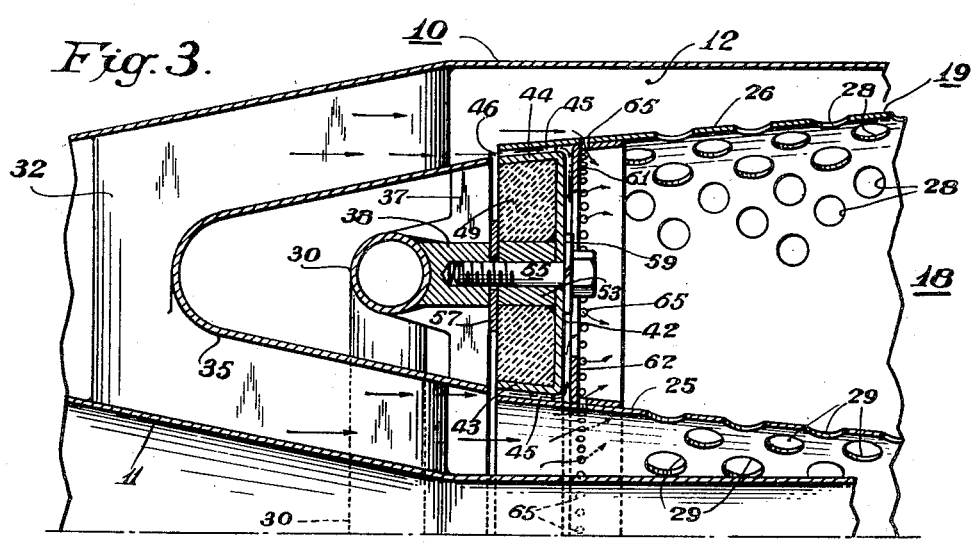
Figure 4:
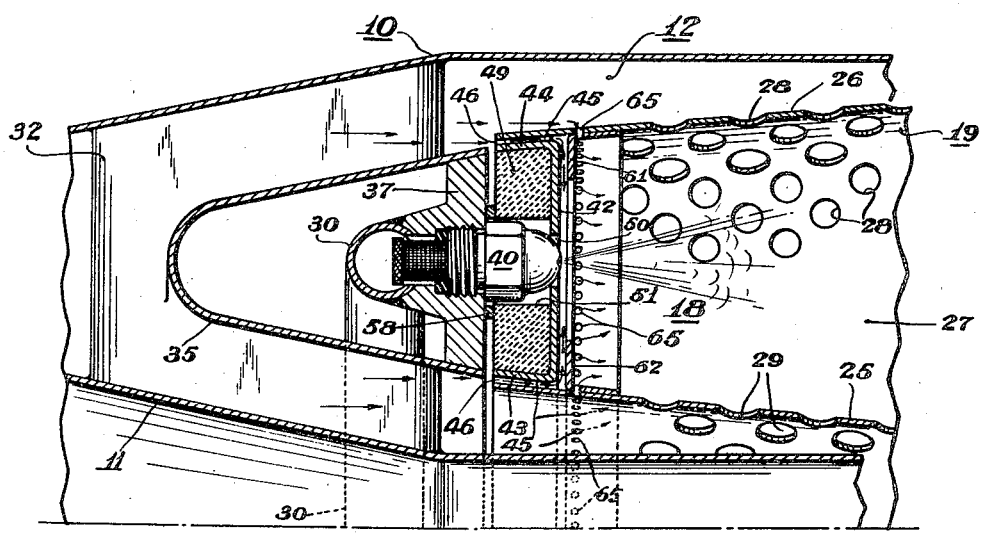
Figure 5:
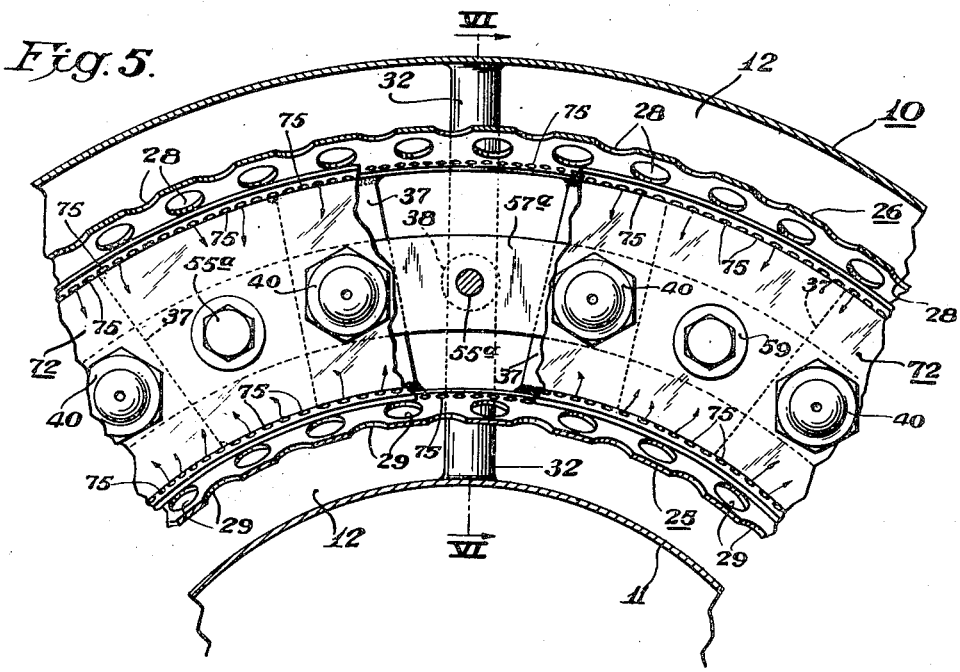
Figure 6:
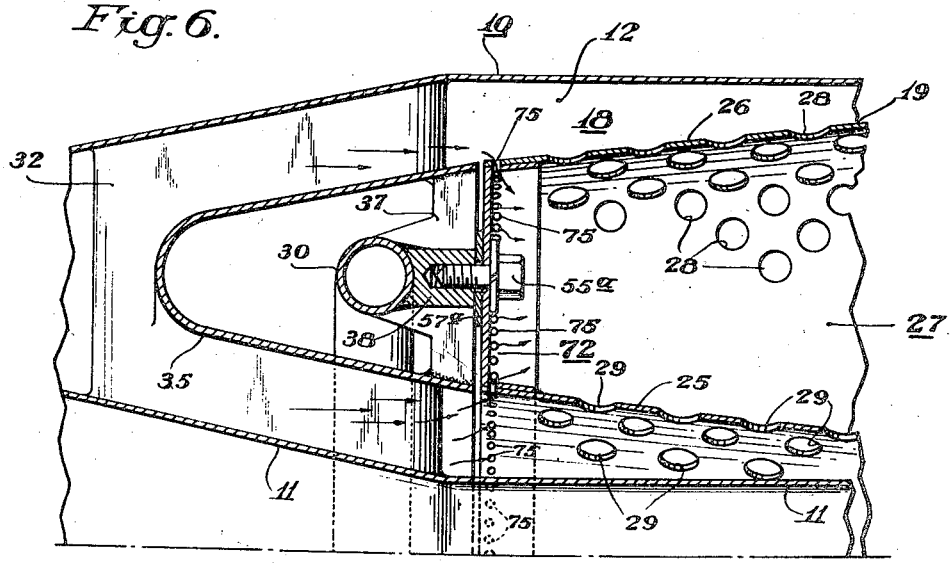

Figs. 3 and 4 are sectional views taken substantially along the lines III—III and IV—IV, respectively, of Fig. 2; and Figs. 5 and 6 are fragmentary sectional views of a combustion apparatus similar to that illustrated in Figs. 3 and 4 but embodying a different form of the invention, the view in Fig. 6 being taken on the line VI—VI of Fig. 5.

Figure 1:
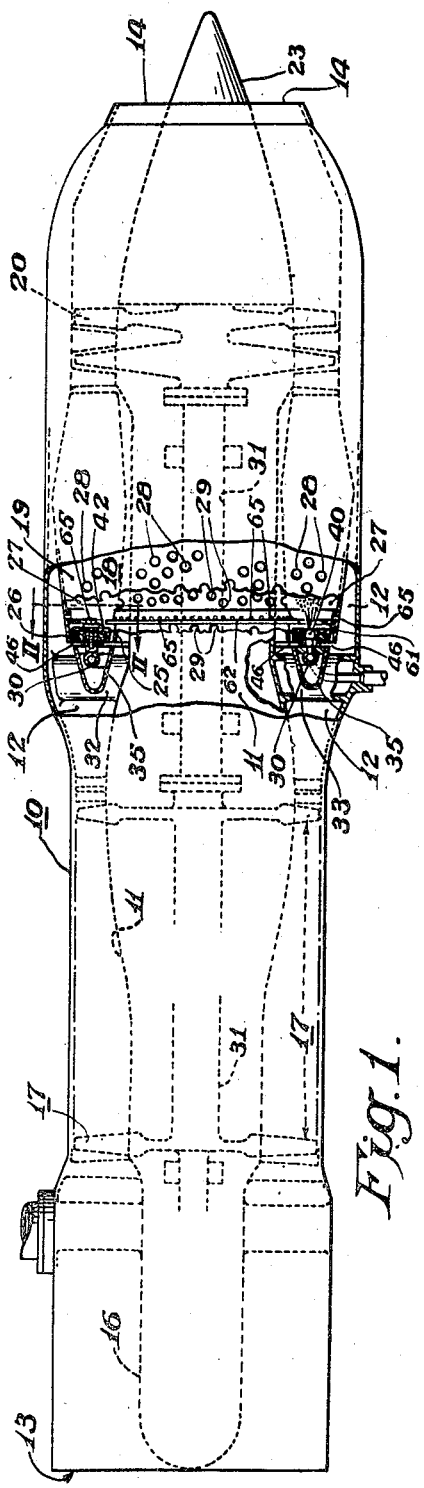
Fig. 1 is a diagrammatic, side elevational view, partly in section, of a gas turbine power plant having a combustion apparatus constructed in accordance with the invention.

Illustrated in Fig. 1 is a preferred form of gas turbine engine of the type with which my invention is adapted to be employed, comprising an outer streamlined or tubular casing structure 10 in which is supported an inner casing structure 11, forming an annular passageway 12 which extends longitudinally through the engine from a forward intake opening 13, to a rearward discharge nozzle 14. This power plant is adapted to be mounted in or on the fuselage of an aircraft with the intake opening 13 pointed in the direction of flight. Mounted within the casing structure 10 along the longitudinal axis thereof are a fairing section 16 which may house auxiliary control apparatus (not shown), a multi-stage axial flow compressor 17, fuel combustion apparatus 18, including a generally annular combustor or basket structure 19, and a two-stage turbine 20, the rotor of which is operatively connected to the rotor of compressor 17 through the medium of a common shaft 31 suitably journaled in the casing structure 11. Rearwardly of the turbine 20 is mounted a tail piece 23, to define, with the rear end of casing 10, the nozzle 14.

In operation, air entering the intake opening 13 is supplied to the compressor 17, which is operative to deliver air under pressure by way of the annular passage 12 to the combustion apparatus 18, for supporting combustion of fuel therein at temperatures ranging between 1000° and 3000° F. From the combustion apparatus 18, heated motive fluid under pressure is expanded through the turbine 20 and is then discharged to atmosphere by way of the nozzle 14, usually in the form of a jet establishing a propulsion force.

In the form chosen for illustration of the present invention, the fuel combustor structure 19 comprises inner and outer frusto-conical walls 25 and 26, which are suitably supported within the annular passage 12, as best shown in Fig. 1. The inner and outer walls 25 and 26 converge toward the forward or apical end of the structure 19 and enclose a combustion chamber 27, which communicates with the annular passageway 12 through a plurality of spaced apertures 28 formed in the outer wall, and through similar apertures 29 formed in the inner wall.

Adjacent the apical end of the combustion structure 19 is mounted an annular fuel manifold 30 which is adapted to be connected to a suitable source of fuel (not shown) and which is supported through the medium of suitably spaced and radially extending strut members, such as the strut members 32 and 33 shown in Fig. 1. An annular fairing section 35 is preferably provided for enclosing the fuel manifold 30, this fairing section being also supported by the strut members 32 and 33.

Welded or otherwise secured to the manifold 30 are a plurality of circumferentially spaced blocks 37, and a plurality of lugs 38 which are interposed between the respective blocks 37, at the rearward or downstream side of the manifold. As best illustrated in Figs. 3 and 4 of the drawings, the blocks 37 are provided with suitable bores for receiving the ends of a number of rearwardly projecting fuel nozzles 40, while the lugs 38 are adapted to afford a convenient means for securing the manifold 30 to the adjacent end of the fuel combustion apparatus 19 in the manner about to be described.

For closing the upstream end of the combustor structure 19, there is provided an annular channel or apical section 42 which has inner and outer annular flanges 43 and 44 adapted to be received between the respective inner and outer walls 25 and 26 of the combustor apparatus. A plurality of spacer elements 45, best shown in Fig. 2 of the drawing, are interposed between the flanges of the apical section 42 and the respective walls 25 and 26, to provide a plurality of circumferentially spaced slots or openings 46 constituting communications between the annular passageway 12 and the combustion chamber 27.

It will be noted that the flanges 43 and 44 of the apical section 42 are pointed forwardly and terminate in substantially the same plane with the upstream ends of the walls 25 and 26. Contained within the space defined by the flanges 43 and 44 is a heat-insulating material 49, which may be any suitable refractory material, and is adapted to increase the heat-resistant characteristics of the apical section. A plurality of apertures 50 are formed in the apical section 42 for receiving the tips of the respective fuel nozzles 40, as best shown in Fig. 4. Openings 51 adapted to register with the apertures 50 are likewise provided in the refractory material 49 for receiving the nozzles.

As best shown in Fig. 3, boss portions 53 are carried by the apical section 42 at points spaced to coincide with the respective lugs 38 carried by the manifold 30, and suitable bolts 55 are fitted through openings in these bosses and into screw-threaded engagement with the respective lugs for securing the apical section and manifold together. In order to insure proper alignment of the respective portions of the assembled structure, as well as to improve the heat-resistant characteristics thereof, a plurality of spacer rings 57 are interposed between the bosses 53 and the corresponding lugs 38. Similarly, spacer rings 58 may be interposed between the respective blocks 37 and the outer surface of the refractory material 49 surrounding each of the nozzles 40, as shown in Fig. 4. If desired, lock washers 59 may be associated with the bolts 55 for insuring a secure assembly.

Welded or otherwise secured to the outer wall 26 of the combustor structure, is an annular baffle member 61, which is disposed in coplanar alignment with a similar annular baffle member 62 mounted on the inner wall 25, for guiding inwardly toward the nozzles 40 the fluid under pressure entering the combustion chamber by way of the communications 46 already referred to. The baffle elements 61 and 62 are for this reason mounted in relatively close relation with respect to the surface of the apical section 42 exposed to the combustion chamber 27, and extend substantially parallel to this surface. The lateral flange portions of each of the baffles 61 and 62 and the portions of the respective walls 26 and 25 to which these elements are secured have formed therein a plurality of closely spaced ports 65, through which fluid under pressure can flow from the annular passageway 12 into the combustion chamber 27 in contact with the downstream surfaces of the baffles.

In operation, fluid under pressure delivered in the usual manner by the axial flow compressor 17 flows through the passageway 12 and enters the combustion chamber 27 by way of the openings 28 and 29 in the combustor structure 19, to support the combustion of fuel injected by the nozzles 40. At the same time, streams of fluid under pressure are supplied from the passageway 12 by way of the communications 46, and are guided by the baffles 61 and 62 over the apical section 42 and the tips of the nozzles 40 exposed to the combustion chamber 27. Fluid under pressure simultaneously injected from the passageway 12 into the combustion chamber by way of ports 65 flows over the surfaces of the baffles 61 and 62 and augments the flow of fluid blanketing and protecting the surfaces of the apical section 42 and the nozzles 40 from the effects of the combustion process taking place within the chamber 27. The localized turbulence thus maintained about the nozzles will effectively prevent accumulation of particles of coke in the region of the combustor apparatus in which coking is most likely to occur. The moving fluid under pressure blanketing the nozzles 40 and adjacent surfaces of the combustor apparatus also tends to improve the efficiency of combustion of the fuel supplied to the chamber 27, thus burning up and minimizing precipitation of coke particles which might be created under less effective combustion conditions.

It will be apparent that the apical section 42 with its refractory portion 49 constitutes a shield effectively minimizing transfer of heat from the combustion chamber to the annular fuel manifold 30, which is thereby maintained sufficiently cool to prevent undesired vaporization of fuel prior to its distribution by way of the nozzles 40.

Referring to Figs. 5 and 6 of the drawings, the somewhat simpler form of the invention therein disclosed may be substituted for that just described when the operating conditions favor such a construction. According to this form of the invention, an apical section 72 is provided for closing the upstream end of the combustion chamber 27, this section having formed therein suitable apertures for receiving the nozzles 40 and bolts 55a which secure the combustor structure 19 to the fuel manifold 30. Spacer rings 57a may be interposed between the lugs 38 and blocks 37 and the section 72 in the manner already explained in connection with Figs. 3 and 4.

A plurality of ports 75 are provided in the flange portions of the apical section 72 and in the adjoining surfaces of the inner and outer walls 25 and 26 for admitting fluid under pressure from the passageway 12 to the combustion chamber 21 in the form of a blanket of turbulent air flowing over the exposed surfaces of the nozzles 40 and adjacent portions of the combustor apparatus. Operation of the invention in this form will be apparent from the foregoing explanation of the invention as disclosed in Figs. 3 and 4 of the drawings.

While the invention has been shown in two forms, it will be obvious to those skilled in the art that it is not so limited, but is susceptible of various changes and modifications without departing from the spirit thereof.

What is claimed is:

1. In combustion apparatus including a casing having a flow passageway for receiving fluid under pressure, a fuel combustor structure comprising apertured walls mounted within said passageway and forming a combustion chamber, and a fuel manifold carrying a nozzle disposed substantially parallel to the axis of said structure for injecting fuel into the upstream end of said combustion chamber in a direction parallel to the path of flow through said passageway, in combination, an apical section closing the upstream end of said combustor structure and having an aperture for receiving the tip of said nozzle, means for securing said manifold and apical section in assembled relation, and means for enveloping the exposed tip of said nozzle and said apical section in streams of air injected substantially radially from said passageway into the upstream end of said combustion chamber, for minimizing accumulation of coke deposits on said nozzle and the adjacent surface of said combustion structure.

2. In combustion apparatus of the type including a casing having an annular flow passageway for receiving fluid under pressure, an annular fuel combustor structure comprising inner and outer apertured walls mounted within said passageway and forming a combustion chamber, and an annular fuel manifold carrying a plurality of spaced nozzles for injecting fuel into the upstream end of said combustion chamber, in combination, an annular apical section closing the upstream end of said combustor structure and having apertures for receiving the tips of said nozzles, means including bolts for securing said manifold and apical section in assembled relation, the adjoining portions of said combustor structure and said apical section defining communications for injecting fluid under pressure from said passageway into said chamber, whereby a blanket of turbulent air is interposed between the combustion region of said chamber and the exposed surfaces of said nozzles for minimizing deposition thereon of products of combustion.

3. In combustion apparatus of the type including a casing having an annular flow passageway for receiving fluid under pressure, an annular fuel combustor structure comprising inner and outer apertured walls mounted within said passageway and forming a combustion chamber, and an annular fuel manifold carrying a plurality of spaced nozzles for injecting fuel into the upstream end of said combustion chamber, the combination of an annular apical section closing the upstream end of said combustor structure and having apertures for receiving the tips of said nozzles, means including bolts for securing said manifold and apical section in assembled relation, and spacer means interposed between said apical section and said combustion structure for establishing restricted communications adapted to supply fluid under pressure from said passageway to said combustion chamber in flow contact with the exposed surfaces of said section and of said nozzles.

4. In combustion apparatus including a casing having an annular flow passageway for receiving fluid under pressure, an annular fuel combustor structure comprising inner and outer apertured walls mounted within said passageway and forming a combustion chamber, and an annular fuel manifold carrying a plurality of spaced nozzles for injecting fuel into the upstream end of said combustion chamber, the combination of an annular apical section closing the upstream end of said combustor structure and having apertures for receiving the tips of said nozzles, means including bolts for securing said manifold and apical section in assembled relation, and spacer means interposed between said section and said combustion structure for establishing restricted communications adapted to supply fluid under pressure from said passageway to said combustion chamber in flow contact with the exposed sections of said nozzles, the walls of said combustor structure carrying inner and outer annular baffles for deflecting fluid under pressure injected by way of said communications against said nozzles and the adjacent surfaces of the said combustor structure.

5. In combustion apparatus, inner and outer convergent apertured walls forming a combustion chamber, an annular fuel manifold carrying a plurality of spaced nozzles for introducing fuel into the upstream end of said combustion chamber, an annular apical section carrying heat insulation and adapted for closing the upstream end of said combustion structure, said section having openings for receiving tips of said nozzles, means establishing restricted communications for supplying air under pressure into the upstream end of said combustion chamber adjacent said nozzles, and means for deflecting streams of air under pressure from said communications over the exposed surfaces of said nozzles and over said apical section.

6. In combustion apparatus of the type including a casing having an annular flow passageway for receiving fluid under pressure, fuel combustor structure comprising apertured walls mounted within said passageway and forming a combustion chamber, and a fuel manifold carrying a nozzle for injecting fuel into the upstream end of said combustion chamber, in combination, a section closing the upstream end of said combustor structure and having an aperture for receiving the tip of said nozzle, means including a bolt for securing said manifold and section in assembled relation, spacer means interposed between said section and the wall of said combustion structure for establishing communications adapted to supply fluid under pressure from said passageway to said combustion chamber adjacent said nozzle, and baffle means disposed within said combustion chamber for deflecting fluid under pressure thus supplied from said communications toward said nozzle and adjacent surfaces, said baffle means being provided with ports through which additional streams of fluid under pressure are injected over the downstream surface thereof.

7. In combustion apparatus of the type including a casing having an annular flow passageway for receiving fluid under pressure, annular fuel combustor structure comprising inner and outer convergent walls mounted within said passageway and forming a combustion chamber, an annular fuel manifold carrying a plurality of spaced nozzles for introducing fuel into the upstream end of said combustion chamber, an annular channel section having inner and outer flanges and adapted for closing the upstream end of said combustor structure, spacers interposed between the inner and outer flanges of said channel section and the respective walls and said combustor structure for providing communications from said passageway to said combustion chamber, said channel section having openings for receiving the ends of said nozzles, and means including bolts for securing said channel member and said annular manifold.

8. In combustion apparatus, inner and outer convergent apertured walls forming a combustion chamber, an annular apical section secured to said walls for closing the upstream end of said chamber, said apical section having associated therewith a plurality of communications for injecting fluid under pressure into said chamber, an annular fuel manifold having a series of mounting elements, fuel nozzles mounted in certain of said mounting elements and adapted to project through the apertures in said apical section into the path of fluid under pressure injected by way of said communications, spacers interposed between said mounting elements and said section, and bolts for securing said section to certain of said mounting elements.

9. In combustion apparatus including a casing having an annular flow passageway for receiving fluid under pressure, and a fuel combustor structure mounted within said passageway and enclosing a combustion chamber, the combination of an apertured section for closing the upstream end of said structure, said end of said structure having a plurality of communications for injecting streams of fluid under pressure from said passageway into said chamber in flow contact with said section, a fuel manifold carrying a nozzle adapted to project through an aperture in said section, within the path of fluid under pressure injected from said communications, spacer means adapted to be interposed between said manifold and said section, and means for securing said manifold and said section together.

HAROLD L. HILDESTAD.

REFERENCES CITED

The following references are of record in the file of this patent:

UNITED STATES PATENTS

| Number | Name | Date |
|---|---|---|
| 2,422,213 | Smith | June 17, 1947 |